United States Patent
Jirka et al.

(10) Patent No.: US 7,752,658 B2
(45) Date of Patent: Jul. 6, 2010

(54) MULTI-SESSION CONNECTION ACROSS A TRUST BOUNDARY

(75) Inventors: Ian C. Jirka, Snoqualmie, WA (US); Gerardo Dilillo, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1041 days.

(21) Appl. No.: 11/428,184

(22) Filed: Jun. 30, 2006

(65) Prior Publication Data
US 2008/0005790 A1   Jan. 3, 2008

(51) Int. Cl.
*G06F 15/173* (2006.01)
(52) U.S. Cl. .................. 726/11; 709/225; 709/226
(58) Field of Classification Search ............ 726/11; 709/225, 226
See application file for complete search history.

(56) References Cited

U.S. PATENT DOCUMENTS

| | | | |
|---|---|---|---|
| 6,233,688 B1 * | 5/2001 | Montenegro | 726/11 |
| 6,553,422 B1 * | 4/2003 | Nelson | 709/227 |
| 6,674,758 B2 * | 1/2004 | Watson | 370/401 |
| 6,978,383 B2 * | 12/2005 | Boyle et al. | 726/15 |
| 7,080,120 B2 * | 7/2006 | Betros et al. | 709/205 |
| 7,406,709 B2 * | 7/2008 | Maher et al. | 726/12 |
| 7,457,849 B2 * | 11/2008 | Hawkins et al. | 709/217 |
| 2004/0059942 A1 * | 3/2004 | Xie | 713/201 |
| 2006/0085548 A1 * | 4/2006 | Maher et al. | 709/227 |
| 2006/0123473 A1 * | 6/2006 | Huang et al. | 726/11 |
| 2006/0195568 A1 * | 8/2006 | Staurnes et al. | 709/224 |
| 2006/0215684 A1 * | 9/2006 | Capone | 370/437 |
| 2008/0115202 A1 * | 5/2008 | McKay | 726/12 |

* cited by examiner

*Primary Examiner*—Christian LaForgia
(74) *Attorney, Agent, or Firm*—Lee & Hayes, PLLC

(57) ABSTRACT

Multi-session connection across a trust boundary is described. In an embodiment, a trust boundary can be implemented to restrict access to resources in a secure region from an unsecure region. A connection can be established that is configured as a client-server connection from the secure region to the unsecure region across the trust boundary. A communication engine in the secure region can then control and maintain the established connection as a two-way simultaneous communication link to the unsecure region across the trust boundary such that session messages can be initiated for communication via the two-way simultaneous communication link from either of the secure region or the unsecure region.

14 Claims, 5 Drawing Sheets

MULTI-SESSION CONNECTION ACROSS A TRUST BOUNDARY

BACKGROUND

In a conventional client-server system, the client device or the server device that initiates establishing a connection for data communication is also the one that controls the data communication session. For example, if a client device initiates a request for updated configuration information, a connection by which to receive the configuration information is established, and a server device provides the configuration information to the client device in response to the request. The client device then always controls the established connection and the server will not provide any additional information without being requested to do so. The server also can not initiate data communication with the client device via the established connection. In one example of a conventional client-server system, the hypertext transfer protocol (HTTP) forces the client-server communication standards.

SUMMARY

This summary is provided to introduce simplified features and concepts of multi-session connection across a trust boundary which is further described below in the Detailed Description. This summary is not intended to identify essential features of the claimed subject matter, nor is it intended for use in determining the scope of the claimed subject matter In an embodiment of multi-session connection across a trust boundary, a trust boundary can be implemented to restrict access to resources in a secure region from an unsecure region. A connection can be established that is configured as a client-server connection from the secure region to the unsecure region across the trust boundary. A communication engine in the secure region can then control and maintain the established connection as a two-way simultaneous communication link to the unsecure region across the trust boundary such that session messages can be initiated for communication via the two-way simultaneous communication link from either of the secure region or the unsecure region. The two-way simultaneous communication link can be implemented as a peer-to-peer, full-duplex, multi-session, and/or similar communication link between the secure region and the unsecure region.

In another embodiment of multi-session connection across a trust boundary, the secure region is an intranet, the unsecure region is an accessible region such as via the Internet, and the trust boundary is a firewall that can restrict access to the resources of the intranet from the accessible region. The client-server connection can be established as a TCP-based (transmission control protocol) connection, and the two-way simultaneous communication link can then be established as a multi-session connection over the TCP-based connection. The two-way simultaneous communication link can be configured between a communication engine in the secure region and an additional communication engine in the unsecure region, where each of the communication engines maintain the two-way simultaneous communication link across the trust boundary.

BRIEF DESCRIPTION OF THE DRAWINGS

The same numbers are used throughout the drawings to reference like features and components.

DETAILED DESCRIPTION

Multi-session connection across a trust boundary is described in which embodiments provide that a connection can be established which is configured as a client-server connection from a secure region to an unsecure region across the trust boundary, such as a firewall. A communication engine in the secure region can then control and maintain the established connection as a two-way simultaneous communication link to the unsecure region across the trust boundary such that session messages can be initiated for communication via the two-way simultaneous communication link from either of the secure region or the unsecure region.

Multi-session connection across a trust boundary enables connectivity and bi-directional data transfer across a trust boundary regardless of network topology, firewalls that restrict two-way communication, and location of a communicating device, region, component, or side of the communication link that can initiate communication of a session message. When the connection is initially established as a client-server connection, a session based protocol layer provides that communications via the two-way simultaneous communication link are not restricted according to which entity initiated establishing the connection.

While features and concepts of the described systems and methods for multi-session connection across a trust boundary can be implemented in any number of different environments, systems, computing-based systems, and/or other configurations, embodiments of multi-session connection across a trust boundary are described in the context of the following exemplary systems and environments.

Figure 1:
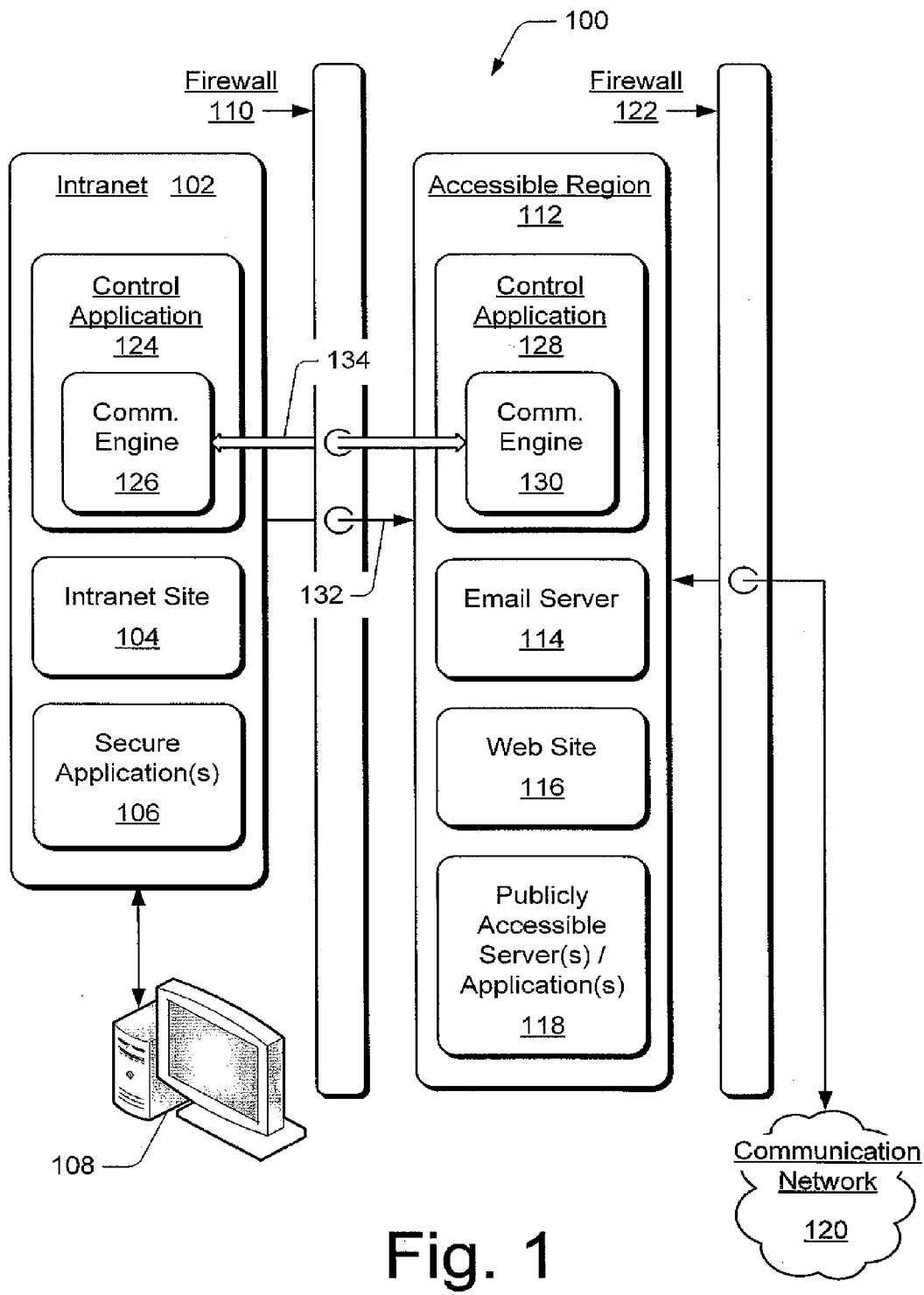
FIG. 1 illustrates an exemplary multi-session connection system in which embodiments of multi-session connection across a trust boundary can be implemented.

FIG. 1 illustrates an exemplary multi-session connection system 100 in which embodiments of multi-session connection across a trust boundary can be implemented. In one embodiment, the multi-session connection system 100 is representative of an exemplary business computing environment that includes an intranet 102 which can be implemented as a secure region to support an intranet site 104 for the business and other various secure applications 106. Computing-based device(s) 108 can be implemented for connection to the intranet 102, such as in a business-related capacity.

The multi-session connection system 100 also includes a firewall 110 that can be implemented to restrict access to resources of the intranet 102 and to secure the intranet 102 from an accessible region 112 that is an unsecure region, such as a publicly accessible region of the exemplary business computing environment. The accessible region 112 can be implemented to support such applications as an email server 114, a Web site 116, and other various publicly accessible servers and/or applications 118 that are accessible via a communication network 120, such as the Internet, through an optional second firewall 122. For example, the email server 114 can receive email messages communicated to the business via the communication network 120.

In this example, each of the intranet 102 and the accessible region 112 separated by the firewall 110 include a similar implementation of a control application to implement embodiment(s) of multi-session connection across a trust boundary. A control application can be implemented as any type of system or operation manager to interface, monitor, and/or control servers, applications, and resources, such as in the intranet 102 and in the accessible region 112. Intranet 102 includes control application 124 and a communication engine 126 (also referred to as an "asynchronous communication engine"). Similarly, the accessible region 112 includes control application 128 and a communication engine 130.

In this example, communication engine 126 is illustrated as being integrated with control application 124, and communication engine 130 is illustrated as being integrated with control application 128. In an alternate embodiment of multi-session connection across a trust boundary, the communication engines can be implemented as independent components across a trust boundary (e.g., the firewall 110).

In an embodiment of multi-session connection across a trust boundary, the intranet 102 is initially a "client" that can establish a connection 132 across the firewall 110 to a "server" in the accessible region 112. In this example, the established connection 132 is a client-server connection from the intranet 102 to the accessible region 112 across the firewall 110. In various implementations, the connection 132 can be a wired or wireless connection and can be implemented as a connection-based transmission control protocol (TCP), implemented as a connectionless-based user datagram protocol (UDP), or implemented as any other type of data transmission protocol. The connection 132 allows that a request for data or information can be initiated from the intranet 102, but precludes or restricts requests being initiated and/or received from the accessible region 112. For example, a TCP-based connection restricts connectivity to the intranet 102 from the accessible region 112 should the accessible region, which is not assumed to be secure, be accessed via the Internet.

After the connection 132 is established, control of the connection is handed-off to the communication engine 126 in the intranet 102 and/or to the communication engine 130 in the accessible region 112. A communication engine 126, 130 (or both communication engines together) can then control and maintain the established connection as a two-way simultaneous communication link 134 across the firewall 110. In an embodiment, the two-way simultaneous communication link 134 is configured and/or established as a multi-session connection over the established TCP-based connection 132. Session messages can then be initiated as streaming and/or discrete packet-based messages for communication via the two-way simultaneous communication link from either of the intranet 102 or the accessible region 112. The two-way simultaneous communication link 134 can be implemented as a peer-to-peer, full-duplex, multi-session, and/or similar communication link between the intranet 102 and the accessible region 112.

In one example of the multi-session connection system 100, the control application 124 or other intranet application may need to task a resource in the accessible region 112, such as requesting or changing a network configuration of the email server 114. The control application 124 can initiate a session message which is communicated from the intranet 102 via the communication engine 126 and the two-way simultaneous communication link 134 to task or control the email server 114 in the accessible region 112. Additionally, a resource in the accessible region 112, such as the email server 114, may provide a status update to the intranet 102. The control application 128 can then initiate a session message which is communicated from the accessible region 112 via the communication engine 130 and the two-way simultaneous communication link 134 to provide the status update to the control application 124 in the intranet 102.

Figure 2:
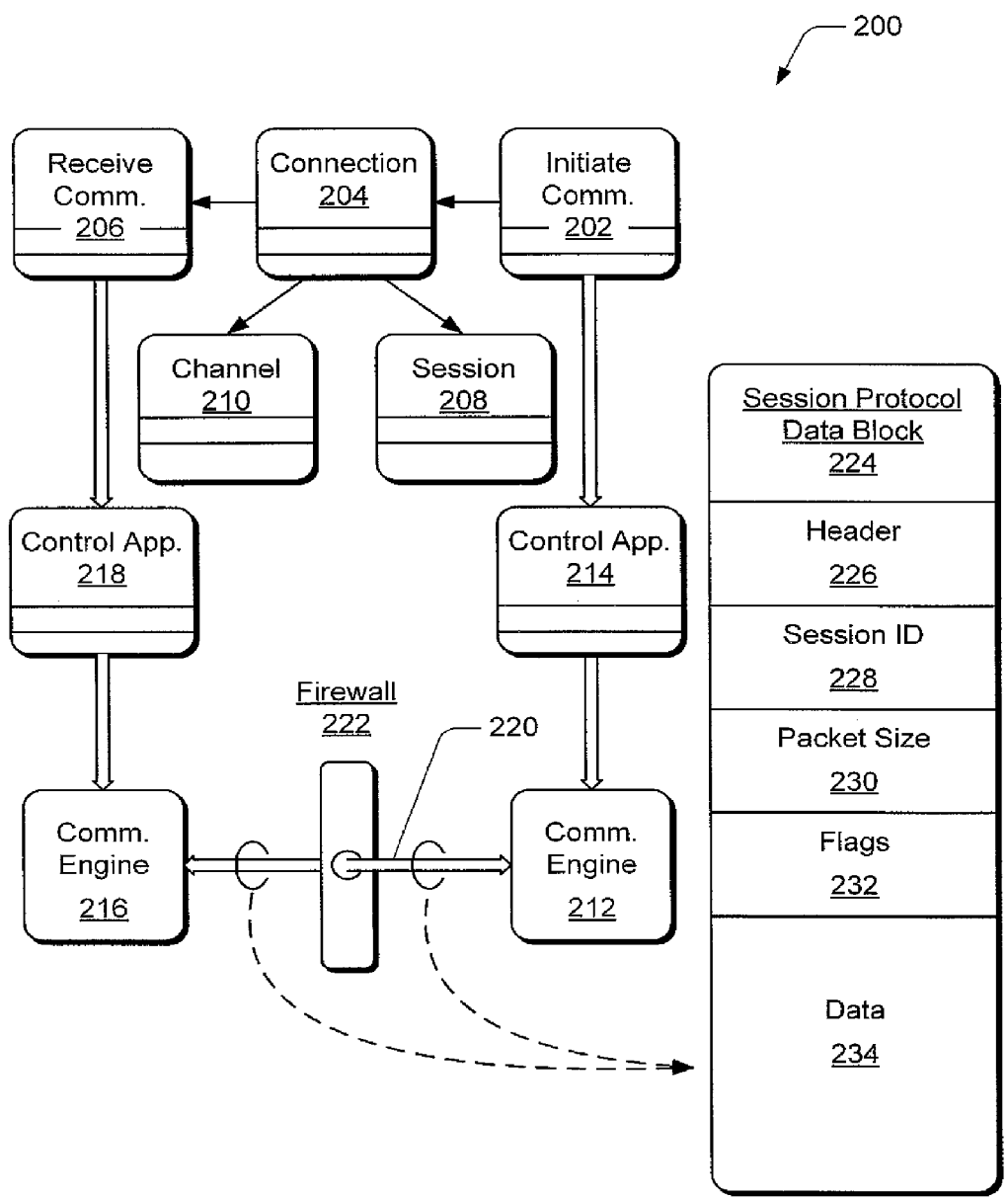
FIG. 2 illustrates an exemplary communication protocol in an embodiment of multi-session connection across a trust boundary.

FIG. 2 illustrates an exemplary communication protocol 200 as a transport object model in which embodiments of multi-session connection across a trust boundary can be implemented. The communication protocol 200 includes an initiate communication object 202 that initiates a connection 204 to a receive communication object 206. In an implementation, the initiate communication object 202 can be implemented at the intranet 102 shown in FIG. 1, and the receive communication object 206 can be implemented at the accessible region 112. As described above, the intranet 102 is initially a "client" to establish a connection across the firewall 110 to a "server" at the accessible region 112.

A session object 208 can be instantiated with a channel 210 that is the underlying physical connection which hosts the multiple sessions of a two-way simultaneous communication link between, for example, the intranet 102 and the accessible region 112. In various implementations, the underlying physical connection can be established as a TCP connection-based communication protocol, as a UDP connectionless-based communication protocol, or as any other type of data transmission protocol.

When the connection 204 is established as the session object 208 and channel 210, the control of the established connection is handed-off to a communication engine of a control application. A communication engine can then maintain the established connection as a two-way simultaneous communication link such that either device, region, component, or side of the communication link can initiate communication of a session message. The two-way simultaneous communication link is implemented as a multi-session layer or protocol on top of the established connection. In this example, the established connection is handed-off to a communication engine 212 associated with a control application 214, and is handed-off to a communication engine 216 associated with a control application 218.

The communication engines 212, 216 can then control and maintain the established connection 204 as a two-way simultaneous communication link 220 via which session data that includes application data can be communicated across a trust boundary, such as firewall 222. In an embodiment, multi-session connection across a trust boundary is implemented to communicate application data utilizing a session protocol data block 224 that contains application data to be communicated.

The session protocol data block 224 is an example that can be utilized to implement embodiment(s) of multi-session connection across a trust boundary. The session protocol data block 224 includes a header 226, a session identifier 228, a packet size indication 230, one or more flags 232, and a data package 234 that is the application data to be communicated. The header 262 (which may be optional in an embodiment) can include diagnostic information to identify where in a data stream sequence the data package 234 is located. The session identifier 228 identifies which of the multi-sessions the data package 234 is associated with, and the packet size indication 230 is an indication of the size of the data package 234. The flag(s) 232 can be utilized as control information to indicate a session creation, a session closure, and/or can include other control data.

A communication engine 212, 216 can receive session protocol data blocks 224 and sequence the corresponding data packages 234 to construct an application message for a resource in a particular region. A communication engine 212, 216 can pass a data package 234 from a session protocol data block 224 to a respective control application 214, 218 which then interfaces with a resource to communicate the data.

Figure 3:
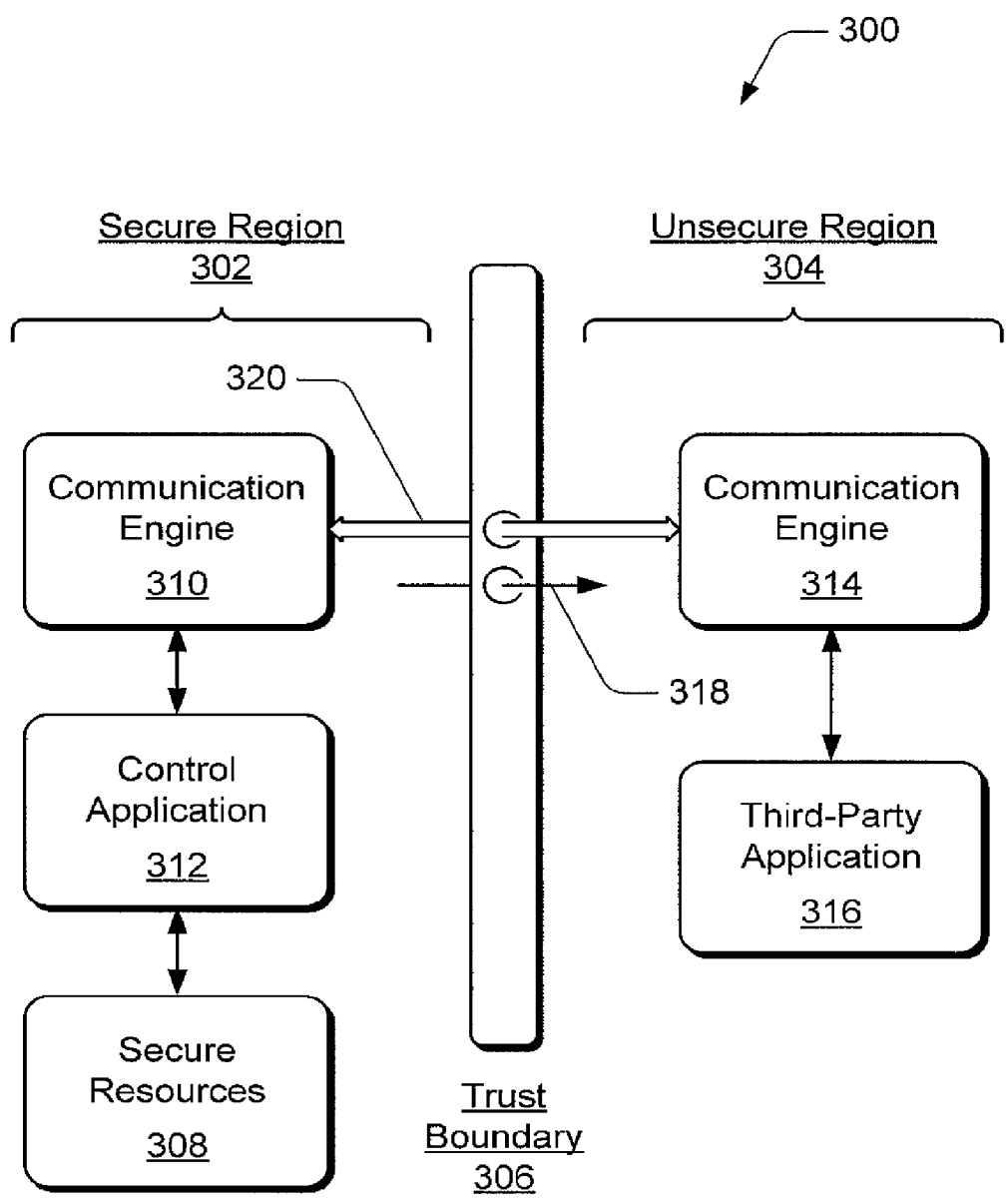
FIG. 3 illustrates another exemplary multi-session connection system in an embodiment of multi-session connection across a trust boundary.

FIG. 3 illustrates another exemplary multi-session connection system 300 in which embodiments of multi-session connection across a trust boundary can be implemented. The multi-session connection system 300 includes a secure region 302 and an unsecure region 304 implemented across a trust boundary 306, such as a firewall in one example, that can be implemented to restrict access to resources 308 of the secure region 302. In this example, the secure region 302 includes a communication engine 310 and a control application 312 which can be implemented as any type of system or operation manager to interface, monitor, and/or control servers, applications, and resources.

The communication engine 310 and the control application 312 are implemented as independent components where the control application 312 interfaces with the communication engine 310 to implement embodiments of multi-session connection across a trust boundary. Similarly, the unsecure region 304 includes a communication engine 314 that can be implemented to interface with any type of third party application 316 in various embodiments of multi-session connection across a trust boundary.

In this example, the secure region 302 is initially a "client" that can establish a connection 318 across the trust boundary 306 to a "server" at the unsecure region 304. The established connection 318 can be a client-server connection from the secure region 302 to the unsecure region 304 across the trust boundary 306. In various implementations, the connection 318 can be a wired or wireless connection and can be implemented as a connection-based transmission control protocol (TCP), implemented as a connectionless-based user datagram protocol (UDP), or implemented as any other type of data transmission protocol. The connection 318 allows that a communication can be initiated from the secure region 302, but precludes or restricts a communication being initiated and/or received from the unsecure region 304.

After the connection 318 is established, control of the connection is handed-off to the communication engine 310 in the secure region 302 and/or to the communication engine 314 in the unsecure region 304. A communication engine 310, 314 (or both communication engines together) can then control and maintain the established connection as a two-way simultaneous communication link 320 across the trust boundary 306. In an embodiment, the two-way simultaneous communication link 320 is configured and/or established as a multi-session connection over the established TCP-based connection 318. Session messages can then be initiated as streaming and/or discrete packet-based messages for communication via the two-way simultaneous communication link 320 from either of the secure region 302 or the unsecure region 304.

Methods for multi-session connection across a trust boundary, such as exemplary method 400 described with reference to FIG. 4, may be described in the general context of computer executable instructions. Generally, computer executable instructions can include applications, routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 4:
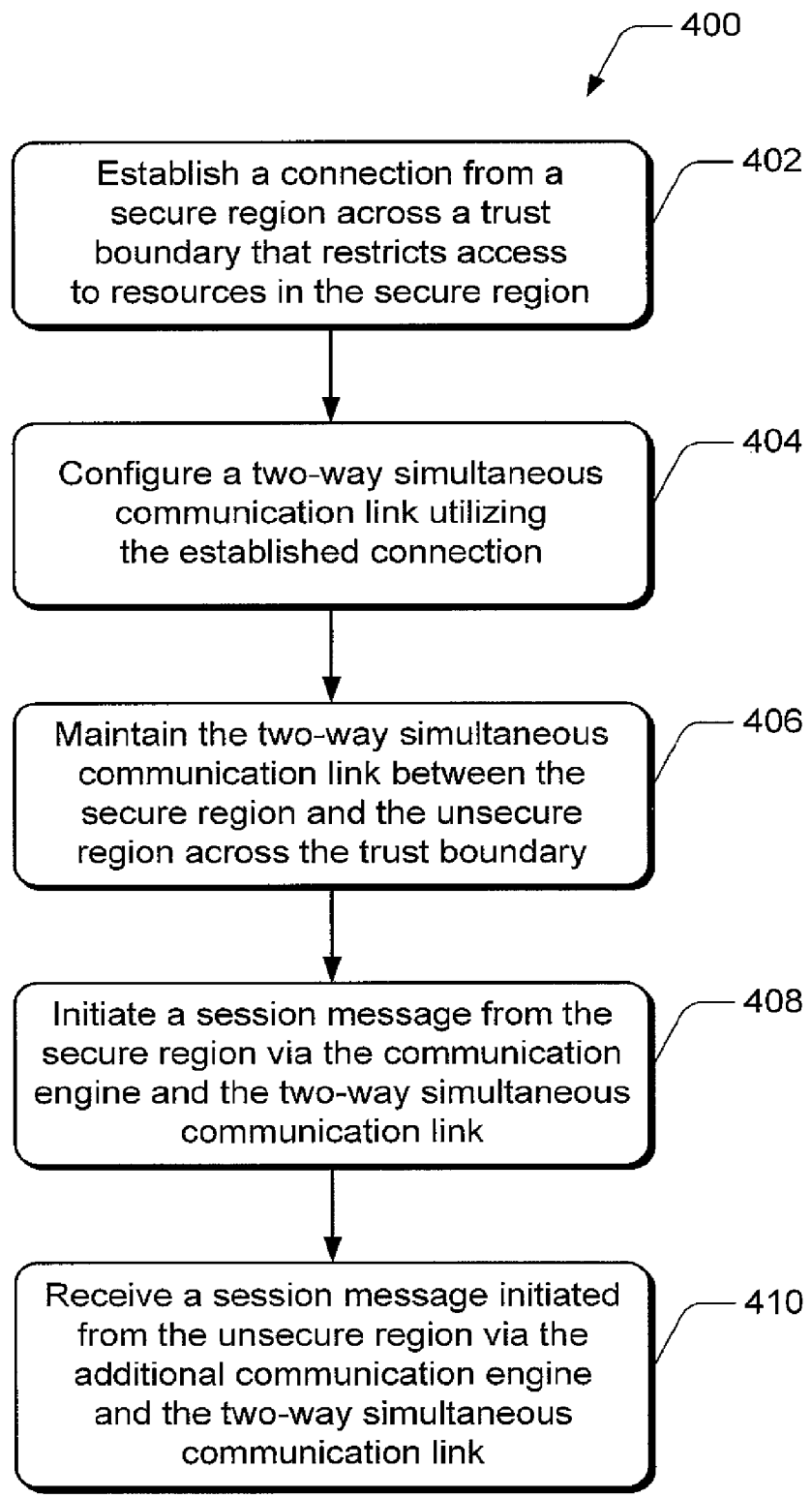
FIG. 4 illustrates exemplary method(s) for multi-session connection across a trust boundary.

FIG. 4 illustrates an exemplary method 400 for multi-session connection across a trust boundary and is described with reference to the multi-session connection systems 100 and 300 shown in respective FIGS. 1 and 3, and with reference to the exemplary communication protocol 200 shown in FIG. 2. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 402, a connection is established from a secure region across a trust boundary that restricts access to resources in the secure region. For example, a client-server connection 318 (FIG. 3) is established from secure region 302 to the unsecure region 304 across the trust boundary 306 that restricts access to resources 308 in the secure region 302. The established connection 318 is configured to allow a request initiated from the secure region 302 and restrict or preclude a request initiated from the unsecure region 304. In an embodiment, the connection 318 can be established as a TCP-based (transmission control protocol) connection.

At block 404, a two-way simultaneous communication link is configured utilizing the established connection. For example, the two-way simultaneous communication link 320 is configured as a multi-session connection over the TCP-based connection between the communication engine 310 in the secure region 302 and the communication engine 314 in the unsecure region 304.

At block 406, the two-way simultaneous communication link is maintained between the secure region and the unsecure region across the trust boundary. For example, the communication engine 310 in the secure region 302 and the communication engine 314 in the unsecure region 304 maintain the two-way simultaneous communication link 320 across the trust boundary 306 such that session messages can be initiated for communication via the two-way simultaneous communication link 320 from either of the secure region 302 or the unsecure region 304.

At block 408, communication of a session message is initiated from the secure region via the communication engine and the two-way simultaneous communication link. For example, a session message can be initiated for communication from the secure region 302 via the communication engine 310 and the two-way simultaneous communication link 320 to task a resource in the unsecure region 304. In an embodiment, the session message can be communicated as data packages 234 (FIG. 2) within respective session protocol data blocks 224 across the trust boundary 306 via the multi-session connection 320.

At block 410, a session message is received when initiated from the unsecure region via the additional communication engine and the two-way simultaneous communication link. For example, a session message can be initiated for communication from the unsecure region 304 via the communication engine 314 and the two-way simultaneous communication link 320. In an embodiment, the session message can be received as data packages 234 within respective session protocol data blocks 224 across the trust boundary 306 via the multi-session connection 320, and the data packages can be sequenced by the communication engine 310 to construct an application message for a resource 308 in the secure region 302.

Figure 5:
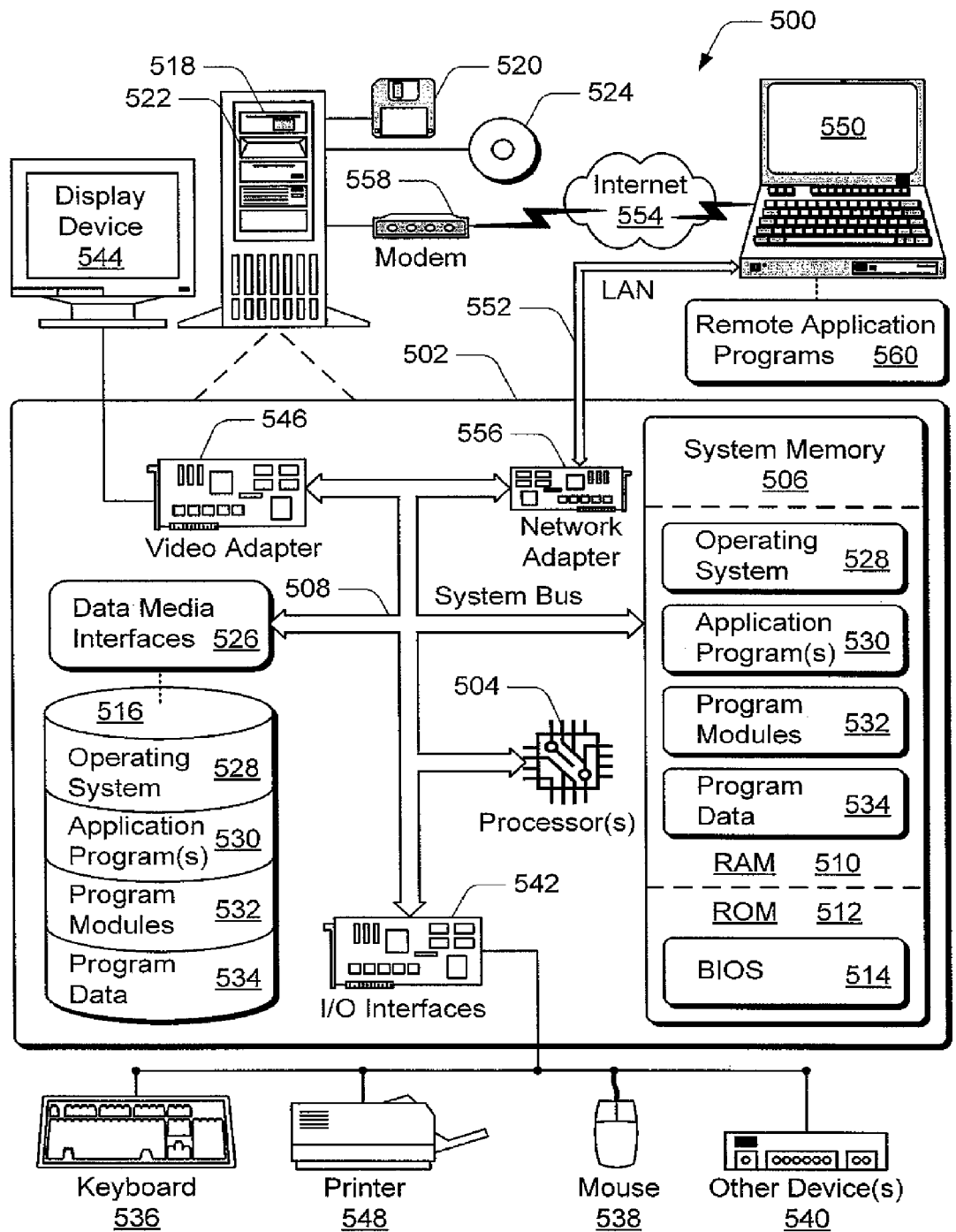
FIG. 5 illustrates exemplary computing systems, devices, and components in an environment that multi-session connection across a trust boundary can be implemented.

FIG. 5 illustrates an exemplary computing environment 500 within which multi-session connection across a trust boundary systems and methods, as well as the computing, network, and system architectures described herein, can be either fully or partially implemented. Exemplary computing environment 500 is only one example of a computing system and is not intended to suggest any limitation as to the scope of use or functionality of the architectures. Neither should the computing environment 500 be interpreted as having any dependency or requirement relating to any one or combination of components illustrated in the exemplary computing environment 500.

The computer and network architectures in computing environment 500 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 500 includes a general-purpose computing system in the form of a computing device 502. The components of computing device 502 can include, but are not limited to, one or more processors 504 (e.g., any of microprocessors, controllers, and the like), a system memory 506, and a system bus 508 that couples the various system components. The one or more processors 504 process various computer executable instructions to control the operation of computing device 502 and to communicate with other electronic and computing devices. The system bus 508 represents any number of several types of bus structures, including a memory bus or memory controller, a peripheral bus, an accelerated graphics port, and a processor or local bus using any of a variety of bus architectures.

Computing environment 500 includes a variety of computer readable media which can be any media that is accessible by computing device 502 and includes both volatile and non-volatile media, removable and non-removable media. The system memory 506 includes computer readable media in the form of volatile memory, such as random access memory (RAM) 510, and/or non-volatile memory, such as read only memory (ROM) 512. A basic input/output system (BIOS) 514 maintains the basic routines that facilitate information transfer between components within computing device 502, such as during start-up, and is stored in ROM 512. RAM 510 typically contains data and/or program modules that are immediately accessible to and/or presently operated on by one or more of the processors 504.

Computing device 502 may include other removable/non-removable, volatile/non-volatile computer storage media. By way of example, a hard disk drive 516 reads from and writes to a non-removable, non-volatile magnetic media (not shown), a magnetic disk drive 518 reads from and writes to a removable, non-volatile magnetic disk 520 (e.g., a "floppy disk"), and an optical disk drive 522 reads from and/or writes to a removable, non-volatile optical disk 524 such as a CD-ROM, digital versatile disk (DVD), or any other type of optical media. In this example, the hard disk drive 516, magnetic disk drive 518, and optical disk drive 522 are each connected to the system bus 508 by one or more data media interfaces 526. The disk drives and associated computer readable media provide non-volatile storage of computer readable instructions, data structures, program modules, and other data for computing device 502.

Any number of program modules can be stored on RAM 510, ROM 512, hard disk 516, magnetic disk 520, and/or optical disk 524, including by way of example, an operating system 528, one or more application programs 530, other program modules 532, and program data 534. Each of such operating system 528, application program(s) 530, other program modules 532, program data 534, or any combination thereof, may include one or more embodiments of the systems and methods described herein.

Computing device 502 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof A user can interface with computing device 502 via any number of different input devices such as a keyboard 536 and pointing device 538 (e.g., a "mouse"). Other input devices 540 (not shown specifically) may include a microphone, joystick, game pad, controller, satellite dish, serial port, scanner, and/or the like. These and other input devices are connected to the processors 504 via input/output interfaces 542 that are coupled to the system bus 508, but may be connected by other interface and bus structures, such as a parallel port, game port, and/or a universal serial bus (USB).

A display device 544 (or other type of monitor) can be connected to the system bus 508 via an interface, such as a video adapter 546. In addition to the display device 544, other output peripheral devices can include components such as speakers (not shown) and a printer 548 which can be connected to computing device 502 via the input/output interfaces 542.

Computing device 502 can operate in a networked environment using logical connections to one or more remote computers, such as remote computing device 550. By way of example, remote computing device 550 can be a personal computer, portable computer, a server, a router, a network computer, a peer device or other common network node, and the like. The remote computing device 550 is illustrated as a portable computer that can include any number and combination of the different components, elements, and features described herein relative to computing device 502.

Logical connections between computing device 502 and the remote computing device 550 are depicted as a local area network (LAN) 552 and a general wide area network (WAN) 554. Such networking environments are commonplace in offices, enterprise-wide computer networks, intranets, and the Internet. When implemented in a LAN networking environment, the computing device 502 is connected to a local network 552 via a network interface or adapter 556. When implemented in a WAN networking environment, the computing device 502 typically includes a modem 558 or other means for establishing communications over the wide area network 554. The modem 558 can be internal or external to computing device 502, and can be connected to the system bus 508 via the input/output interfaces 542 or other appropriate mechanisms. The illustrated network connections are merely exemplary and other means of establishing communication link(s) between the computing devices 502 and 550 can be utilized.

In a networked environment, such as that illustrated with computing environment 500, program modules depicted relative to the computing device 502, or portions thereof, may be stored in a remote memory storage device. By way of example, remote application programs 560 are maintained with a memory device of remote computing device 550. For purposes of illustration, application programs and other executable program components, such as operating system 528, are illustrated herein as discrete blocks, although it is recognized that such programs and components reside at various times in different storage components of the computing device 502, and are executed by the one or more processors 504 of the computing device 502.

Although embodiments of multi-session connection across a trust boundary have been described in language specific to features and/or methods, it is to be understood that the subject of the appended claims is not necessarily limited to the specific features or methods described. Rather, the specific features and methods are disclosed as exemplary implementations of multi-session connection across a trust boundary.

The invention claimed is:

1. A multi-session connection system, comprising:
    a trust boundary configured to restrict access to resources in a secure region from an unsecure region;
    an established connection configured as a client-server connection from the secure region to the unsecure region across the trust boundary;
    a communication engine in the secure region, the communication engine stored in memory and executable on one or more processors to control and maintain the established connection as a two-way simultaneous communication link to the unsecure region across the trust boundary such that session messages can be initiated for communication via the two-way simultaneous communication link from either of the secure region or the unsecure region;
    an additional communication engine in the unsecure region, the additional communication engine stored in memory and executable on one or more processors to control and maintain the established connection as the two-way simultaneous communication link to the secure region across the trust boundary; and
    a control application in the secure region, the control application stored in memory and executable on one or more processors to at least one of control or monitor the resources in the secure region, wherein the control application is further configured to initiate communication of a session message from the secure region via the communication engine and the two-way simultaneous communication link, the session message tasking a resource in the unsecure region;
    wherein the tasking of the resource in the unsecured region comprises requesting that the resource change a network configuration of the resource.

2. A system as recited in claim 1, wherein the secure region is an intranet, the unsecure region is an accessible region, and the trust boundary is a firewall configured to restrict access to the resources of the intranet from the accessible region.

3. A system as recited in claim 1, wherein the resource in the unsecure region is configured to initiate communication of an additional session message from the unsecure region via the additional communication engine and the two-way simultaneous communication link.

4. A system as recited in claim 1, further comprising an additional control application in the unsecure region configured to at least one of control or monitor additional resources in the unsecure region, the additional communication engine being integrated with the additional control application in the unsecure region, and the communication engine being integrated with the control application in the secure region.

5. A system as recited in claim 1, wherein the client-server connection is established as a TCP-based (transmission control protocol) connection, and wherein the two-way simultaneous communication link is established as a multi-session connection over the TCP-based connection.

6. A system as recited in claim 5, wherein the session messages are configured for communication as data packages within session protocol data blocks that are communicated across the trust boundary via the multi-session connection.

7. A system as recited in claim 6, wherein the communication engine is further configured to sequence the data packages received within the session protocol data blocks to construct an application message for a resource in the secure region.

8. One or more computer readable media comprising computer-executable instructions, that when executed by computer, perform a method, comprising:
    establishing a connection from a secure region to an unsecure region across a trust boundary that restricts access to resources in the secure region, the connection being configured to allow initiating a request for data from the secure region and preclude a request for data initiated from the unsecure region;
    configuring a two-way simultaneous communication link utilizing the established connection, wherein the two-way simultaneous communication link is configured between a communication engine in the secure region and an additional communication engine in the unsecure region, each of the communication engine and the additional communication engine maintaining the two-way simultaneous communication link across the trust boundary;
    maintaining the two-way simultaneous communication link between the secure region and the unsecure region across the trust boundary such that session messages can be initiated for communication via the two-way simultaneous communication link from either of the secure region or the unsecure region;
    initiating communication of a session message from a resource in the secure region via the communication engine and the two-way simultaneous communication link; and
    receiving the session message initiated from the resource in the secure region via the additional communication engine and the two-way simultaneous communication link, the session message tasking a resource in the unsecure region,
    wherein the tasking of the resource in the unsecured region comprises requesting that the resource change a network configuration of the resource.

9. A method as recited in claim 8, wherein the secure region is an intranet, the unsecure region is an accessible region, and the trust boundary is a firewall that restricts access to the resources of the intranet from the accessible region, and wherein the connection is established as a client-server connection from the intranet to the accessible region across the firewall.

10. A method as recited in claim 8, wherein the connection is established as a TCP-based (transmission control protocol) connection, and wherein the two-way simultaneous communication link is configured as a multi-session connection over the TCP-based connection.

11. A method as recited in claim 10, further comprising communicating the session messages as data packages within session protocol data blocks across the trust boundary via the multi-session connection.

12. A method as recited in claim 10, further comprising receiving the session messages as data packages within session protocol data blocks across the trust boundary via the multi-session connection, and sequencing the data packages to construct an application message for a resource in the secure region.

13. One or more computer readable media comprising computer executable instructions that, when executed, direct a computing-based device to:
   establish a connection across a trust boundary that restricts access to resources in, a secure region, the connection being configured to allow initiating a request for data from the secure region and restrict requests from an additional region;
   configure a two-way simultaneous communication link over the established connection between a communication engine in the secure region and an additional communication engine in the additional region across the trust boundary such that session messages can be initiated for communication via the two-way simultaneous communication link from either of the secure region or the additional region, and each of the communication engine and the additional communication engine maintaining the two-way simultaneous communication link across the trust boundary;
   initiate communication of a session message from a resource in the secure region via the communication engine and the two-way simultaneous communication link; and
   receive the session message initiated from the resource in the secure region via the additional communication engine and the two-way simultaneous communication link, wherein the session message is to task an application in the unsecure region,
   wherein the tasking of the resource in the unsecured region comprises requesting that the resource change a network configuration of the resource.

14. One or more computer readable media as recited in claim 13, further comprising computer executable instructions that, when executed, direct the computing-based device to at least one of: communicate the session messages as data packages within session protocol data blocks across the trust boundary via the two-way simultaneous communication link; receive the session messages as data packages within the session protocol data blocks across the trust boundary via the two-way simultaneous communication link.

* * * * *